(12) United States Patent
Kim et al.

(10) Patent No.: US 9,669,835 B2
(45) Date of Patent: Jun. 6, 2017

(54) METHOD AND APPARATUS FOR CONTROLLING A POWERTRAIN SYSTEM DURING DECELERATION

(71) Applicant: GM GLOBAL TECHNOLOGY OPERATIONS LLC, Detroit, MI (US)

(72) Inventors: Kee Yong Kim, Ann Arbor, MI (US); Anthony H. Heap, Ann Arbor, MI (US); Michael Andrew Miller, Fenton, MI (US); Luke D. Shepley, Novi, MI (US); Michael Vincent Woon, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 14/923,593

(22) Filed: Oct. 27, 2015

(65) Prior Publication Data

US 2017/0113695 A1    Apr. 27, 2017

(51) Int. Cl.
*B60W 10/08*    (2006.01)
*B60W 30/18*    (2012.01)
(Continued)

(52) U.S. Cl.
CPC ......... *B60W 30/18127* (2013.01); *B60K 6/20* (2013.01); *B60T 1/10* (2013.01); *B60W 10/026* (2013.01); *B60W 10/06* (2013.01); *B60W 10/08* (2013.01); *B60W 20/10* (2013.01); *F02D 41/123* (2013.01); *B60W 2510/0638* (2013.01); *B60W 2510/1015* (2013.01); *B60W 2710/024* (2013.01); *B60Y 2200/92* (2013.01);
(Continued)

(58) Field of Classification Search
CPC ............ Y10T 477/26; Y10T 477/6422; Y10T 477/735; Y10T 477/79; B60W 30/18127; B60W 10/026; B60W 10/08; B60W 10/06; B60W 20/10; B60W 2710/024; B60W 2510/1015; B60W 2510/0638; F02D 41/123; Y10S 903/93; B60Y 2300/421
See application file for complete search history.

(56) References Cited

U.S. PATENT DOCUMENTS 6,376,927 B1 * 4/2002 Tamai .................... B60K 6/383
                                                                        290/31
9,162,676 B2 * 10/2015 Eto .......................... B60K 6/48
(Continued)

*Primary Examiner* — Roger Pang
(74) *Attorney, Agent, or Firm* — Quinn IP Law

(57) ABSTRACT

A method for controlling a powertrain includes, in response to an output torque request that includes deceleration, operating an internal combustion engine in a fuel cutoff state and in a cylinder deactivation state, controlling a clutch of a torque converter in an activated state, and operating an electric machine in a regenerative braking state. A state of the powertrain related to engine speed is monitored. The internal combustion engine is commanded to transition from the cylinder deactivation state to an all-cylinder state and the electric machine operates in the regenerative braking state including ramping down magnitude of regenerative braking torque when the engine speed is less than a first threshold speed. The torque converter clutch is commanded to a released state when the engine speed is less than a second threshold speed, with the first threshold speed being greater than the second threshold speed.

19 Claims, 4 Drawing Sheets

(51) Int. Cl.
*B60W 10/02* (2006.01)
*B60W 10/06* (2006.01)
*B60W 20/10* (2016.01)
*F02D 41/12* (2006.01)
*B60K 6/20* (2007.10)
*B60T 1/10* (2006.01)

(52) U.S. Cl.
CPC ..... *B60Y 2300/421* (2013.01); *B60Y 2300/43* (2013.01); *B60Y 2300/60* (2013.01); *B60Y 2300/91* (2013.01); *Y10S 903/93* (2013.01); *Y10T 477/26* (2015.01); *Y10T 477/6422* (2015.01); *Y10T 477/735* (2015.01); *Y10T 477/79* (2015.01)

(56) References Cited

U.S. PATENT DOCUMENTS

| | | | |
|---|---|---|---|
| 2006/0108163 A1* | 5/2006 | Kitano | B60K 6/485 180/65.26 |
| 2015/0166037 A1* | 6/2015 | Bergkoetter | F02D 13/06 477/181 |
| 2015/0203118 A1* | 7/2015 | Mitsuyasu | B60W 10/02 701/67 |

* cited by examiner

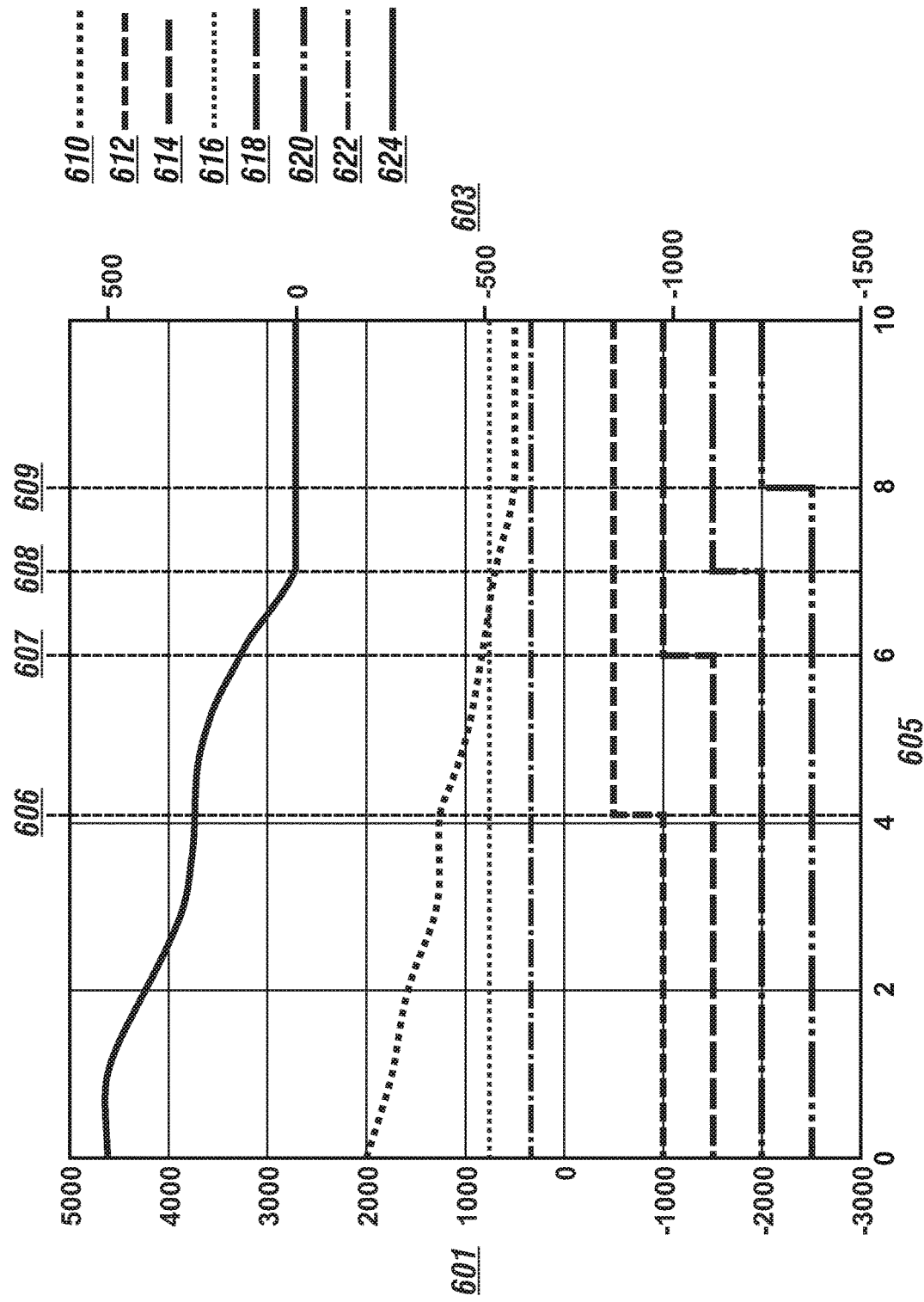

METHOD AND APPARATUS FOR CONTROLLING A POWERTRAIN SYSTEM DURING DECELERATION

TECHNICAL FIELD

The present disclosure relates to powertrain systems for vehicles, and control related thereto.

BACKGROUND

Known vehicle powertrain systems include internal combustion engines and electric motor/generators that are coupled to transmissions to transfer torque to a driveline for tractive effort. Known electric motor/generators are supplied electric power from high-voltage energy storage systems. Powertrain systems may employ regenerative control systems to recover electric power for charging the high-voltage energy storage system in response to operator commands that include braking and/or coasting.

SUMMARY

A powertrain system including an internal combustion engine, a transmission and an electric motor/generator is described, and includes the electric motor/generator rotatably coupled to a crankshaft of the internal combustion engine. An output member of the transmission is rotatably coupled to a driveline to transfer tractive torque thereto. A method for controlling the powertrain system includes, in response to an output torque request that includes deceleration of the output member, operating the internal combustion engine in a fuel cutoff state and in a cylinder deactivation state, controlling a clutch of the torque converter in an activated state, and operating the electric machine in a regenerative braking state. A state of the powertrain related to engine speed is monitored. The internal combustion engine is commanded to transition from the cylinder deactivation state to an all-cylinder state and the electric machine operates in the regenerative braking state including ramping down magnitude of regenerative braking torque when the engine speed is less than a first threshold speed. The torque converter clutch is commanded to a released state when the engine speed is less than a second threshold speed, with the first threshold speed being greater than the second threshold speed.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 6 graphically shows engine speed during a deceleration event for an embodiment of the vehicle and powertrain system described with reference to FIG. 1 employing an embodiment of the coordinated engine state selection and torque converter clutch release control routine described with reference to FIGS. 2 through 5, in accordance with the disclosure.

DETAILED DESCRIPTION

Figure 1:
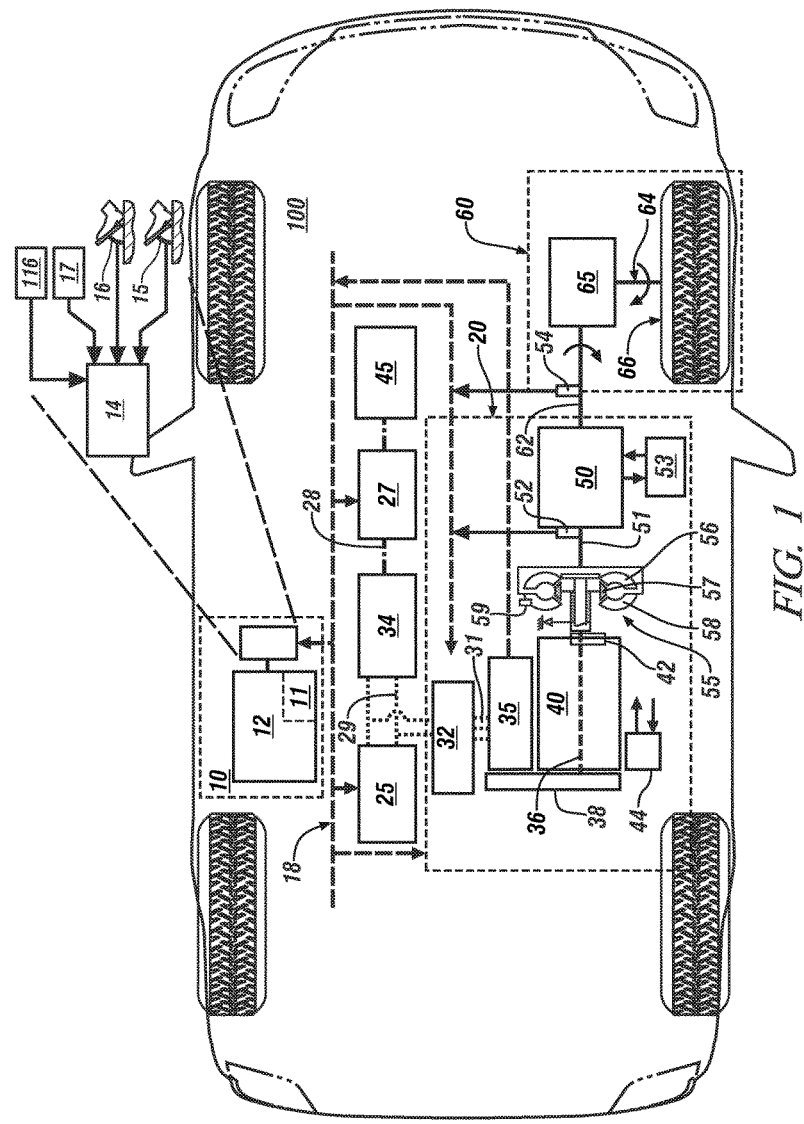
FIG. 1 schematically illustrates a vehicle including a powertrain system that includes an internal combustion engine having a crankshaft that is coupled to a transmission via a torque converter and is coupled to an electrically-powered torque machine, wherein the transmission couples to a driveline of the vehicle, in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. Like numerals refer to like elements throughout the description. The illustrated powertrain system 20 includes multiple torque-generating devices including an internal combustion engine 40 and at least one electrically-powered torque machine (electric machine) 35 that transfer torque through a transmission 50 to a driveline 60. The concepts described herein may apply to any suitable powertrain configuration that includes the internal combustion engine 40 and the electric machine 35 coupled via the transmission 50 to the driveline 60.

In one embodiment, the powertrain system 20 includes the torque machine 35 rotatably mechanically coupled to a crankshaft 36 of the engine 40 that rotatably mechanically couples to an input member 33 of the transmission 50 via a torque converter 55. As shown, the crankshaft 36 mechanically rotatably couples to the torque machine 35 via a pulley mechanism 38. The pulley mechanism 38 is configured to effect torque transfer between the engine 40 and the torque machine 35, including transferring torque from the torque machine 35 to the engine 40 for engine autostart and autostop operations, tractive torque assistance, torque transfer for regenerative vehicle braking, and torque transfer from engine 40 to the torque machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the torque machine 35, referred to as a belt-alternator-starter (BAS) system. Alternatively, the pulley mechanism 38 may include a positive-displacement gearing mechanism, or another suitable positive mechanical connection. As such, the electrically-powered torque machine 35 can be employed to rotate the engine 40. Other configurations of the multi-mode powertrain system 20 that include the torque machine 35 rotatably mechanically coupled to the engine 40 may be employed within the scope of this disclosure.

The electric machine 35 is preferably a high-voltage multi-phase electric motor/generator configured to convert stored electric energy to mechanical power and convert mechanical power to electric energy that may be stored in a high-voltage energy storage device (battery) 25. The battery 25 may be any high-voltage energy storage device, e.g., a multi-cell lithium ion device, an ultra-capacitor, or another suitable device without limitation. Monitored parameters related to the battery 25 preferably include a state of charge (SOC), temperature, and others. In one embodiment, the battery 25 may electrically connect via an on-vehicle battery charger to a remote, off-vehicle electric power source for charging while the vehicle 100 is stationary. The battery 25 electrically connects to an inverter module 32 via a high-voltage DC bus 29 to transfer high-voltage DC electric power via three-phase conductors 31 to the electric machine 35 in response to control signals originating in the control system 10.

The electric machine 35 preferably includes a rotor and a stator, and electrically connects via the inverter module 32 and the high-voltage bus 29 to the high-voltage battery 25. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control of the IGBTs to convert stored DC electric power originating in the high-voltage battery 25 to AC electric power to drive the electric machine 35 to generate torque. Similarly, the inverter module 32 converts mechanical power transferred to the electric machine 35 to DC electric power to generate electric energy that is storable in the battery 25, including as part of a regenerative braking control strategy. The inverter module 32 receives motor control commands and controls inverter states to provide the motor drive and regenerative braking functionality. In one embodiment, a DC/DC electric power converter 23 electrically connects to the high-voltage bus 29, and provides electric power to a low-voltage battery 27 via a low-voltage bus 28. Such electric power connections are known and not described in detail. The low-voltage battery 27 electrically connects to an auxiliary power system to provide low-voltage electric power to low-voltage systems 45 on the vehicle, including, e.g., electric windows, HVAC fans, seats, and other devices.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form in-cylinder combustion charges that generate an expansion force onto pistons, with such force transferred to the crankshaft 36 to produce torque. One sensing device for monitoring the engine 40 is a Hall-effect sensor 42 or another suitable sensor that may be configured to monitor rotational speed of the crankshaft 36 to determine engine rotational speed (RPM). The actuators of the engine 40 are preferably controlled by an engine controller (ECM) 44. The engine 40 is preferably mechanized with suitable hardware and the ECM 44 preferably includes suitable executable routines to execute autostart and autostop functions, fueled and fuel cutoff (FCO) functions, and all-cylinder and cylinder deactivation functions during ongoing operation of the powertrain system 20. The engine 40 is considered to be in an OFF state when it is not rotating. The engine 40 is considered to be in an ON state when it is rotating. The all-cylinder state includes engine operation wherein all of the engine cylinders are activated by being fueled and fired. The cylinder deactivation state includes engine operation wherein one or a plurality of the engine cylinders are deactivated by being unfueled and unfired, and preferably operating with engine exhaust valves in open states to minimize pumping losses, while the remaining cylinders are fueled and fired and thus producing torque. The ON state may include the FCO state in which the engine 40 is spinning and unfueled. The ON state may include the cylinder deactivation state. The ON state may include the FCO state in combination with the cylinder deactivation state. Engine mechanizations and control routines for executing autostart, autostop, FCO and cylinder deactivation routines are known and not described herein. Engine operation may be described in context of several control variables, including an engine operation state, an engine fueling state, and an engine cylinder state. One engine operation control variable includes either the ON or OFF state. Another engine fueling control variable includes either the fueled state or the FCO state. Another engine cylinder control variable includes either the all-cylinder state or the cylinder deactivation state.

The torque converter 55 is a rotatable torque coupling device arranged between the engine 40 and transmission 50, preferably including a pump 56 rotatably coupled to the crankshaft 36, a stator 57, an impeller 58 rotatably coupled to an input member 51 to the transmission 50, and a controllable clutch 59. The torque converter 44 operates to provide fluid torque coupling between the pump 56 and the impeller 58 when the clutch 59 is deactivated or released, and provides mechanical torque coupling between the pump 56 and the impeller 58 when the clutch 59 is activated. Design of torque converters and torque converter clutches is known and not described in detail herein.

The transmission 50 may be arranged in a step-gear configuration in one embodiment, and may include one or more differential gear sets and activatable clutches configured to effect torque transfer in one of a plurality of fixed gear states over a range of speed ratios between the engine 40, the input member 51 and the output member 62. The transmission 40 may include a first rotational speed sensor 52 in the form of a Hall-effect sensor or another suitable sensor that may be configured to monitor rotational speed of the input member 51 and/or a second rotational speed sensor 54 that may be configured to monitor rotational speed of the output member 62. The transmission 50 includes any suitable configuration, and may be an automatic transmission that automatically shifts between the fixed gear states to operate at a gear ratio that achieves a preferred match between an output torque request and an engine operating point. The transmission 50 automatically executes upshifts to shift to a gear state having a lower numerical multiplication ratio (gear ratio) at preset speed/load points and executes downshifts to shift to a gear state having a higher numerical multiplication ratio at preset speed/load points. The transmission 50 may be controlled using a controllable hydraulic circuit that communicates with a transmission controller (TCM) 53, which may also control the torque converter clutch 59. The transmission 50 executes upshifts to shift to a fixed gear that has a lower numerical multiplication ratio (gear ratio) and executes downshifts to shift to a fixed gear that has a higher numerical multiplication ratio. A transmission upshift may require a reduction in engine speed so the engine speed matches transmission output speed multiplied by the gear ratio at a gear ratio associated with a target gear state. A transmission downshift may require an increase in engine speed so the engine speed matches transmission output speed multiplied by the gear ratio at a gear ratio associated with the target gear state. Designs of transmissions and transmission shifting are known and not described in detail herein. Transmission operation may be described in context of a control variable that may be communicated to the transmission 50 that is related to a selected fixed gear state.

The driveline 60 may include a differential gear device 65 that mechanically couples to an axle 64 that mechanically couples to a wheel 66 in one embodiment. The driveline 60 transfers tractive power between the output member 62 of the transmission 50 and a road surface. The powertrain system 20 is illustrative, and the concepts described herein apply to other powertrain systems that are similarly configured.

The control system 10 preferably includes a controller 12 that signally connects to an operator interface 14. The controller 12 may include a control device 11 that provides hierarchical control of a plurality of control devices that are co-located with the individual elements of the powertrain system 20 to effect operational control thereof, including, e.g., the inverter module 32, the ECM 44 and the TCM 53. The controller 12 communicates with each of the inverter module 32, the ECM 44 and the TCM 53, either directly or via a communications bus 18 to monitor operation and control operations thereof.

The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal 15, a brake pedal 16, a transmission range selector (PRNDL) 17, a steering wheel, and a headlamp switch 116. The accelerator pedal 15 provides signal input including an accelerator pedal position indicating an operator request for vehicle acceleration and the brake pedal 16 provides signal input including a brake pedal position indicating an operator request for vehicle braking. The transmission range selector 17 provides signal input indicating direction of operator-intended motion of the vehicle including a discrete number of operator-selectable positions that indicate the preferred rotational direction of the output member 62 in either a forward or a reverse direction.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component 11 in the form of memory and storage devices (read only, programmable read only, random access, hard drive, etc.). The non-transitory memory component 11 is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals, for example each 100 microseconds or 3.125, 6.25, 12.5, 25 and 100 milliseconds during ongoing operation. Alternatively, routines may be executed in response to occurrence of a triggering event. Communication between controllers, and communication between controllers, actuators and/or sensors may be accomplished using a direct wired link, a networked communications bus link, a wireless link, a serial peripheral interface bus or any another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Vehicle operation responsive to operator requests includes operating modes of acceleration, braking, steady-state running, coasting, and idling. The acceleration mode includes an operator request to increase vehicle speed. The braking mode includes an operator request to decrease vehicle speed. The steady-state running mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The coasting mode includes vehicle operation wherein vehicle speed is above a minimum threshold speed and the operator request to the accelerator pedal is at a point that is less than required to maintain the present vehicle speed. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal.

Figure 2:
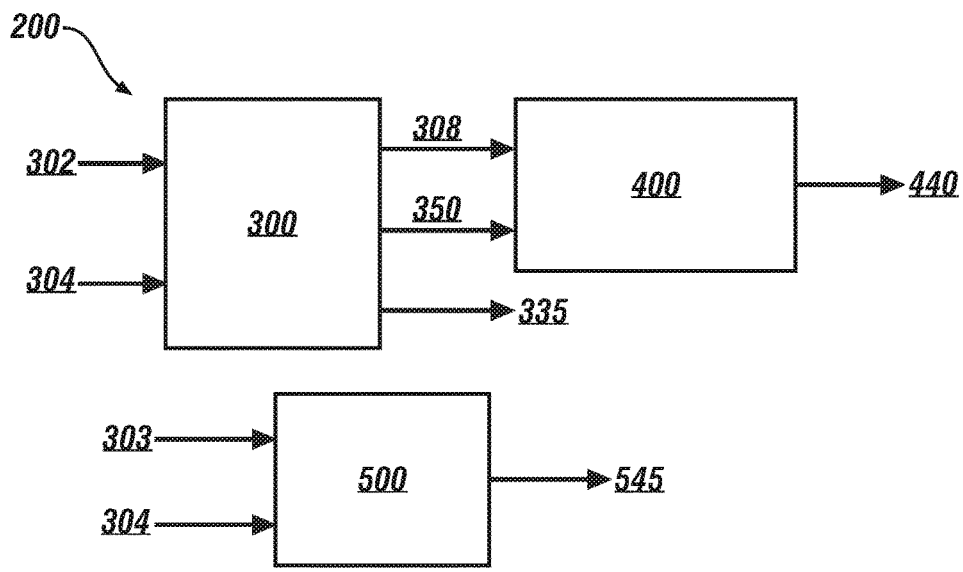
FIG. 2 schematically illustrates a coordinated engine state selection and torque converter clutch release control routine for controlling an embodiment of the powertrain system described with reference to FIG. 1 in response to a change in an output torque request that includes vehicle deceleration, in accordance with the disclosure.
Figure 3:
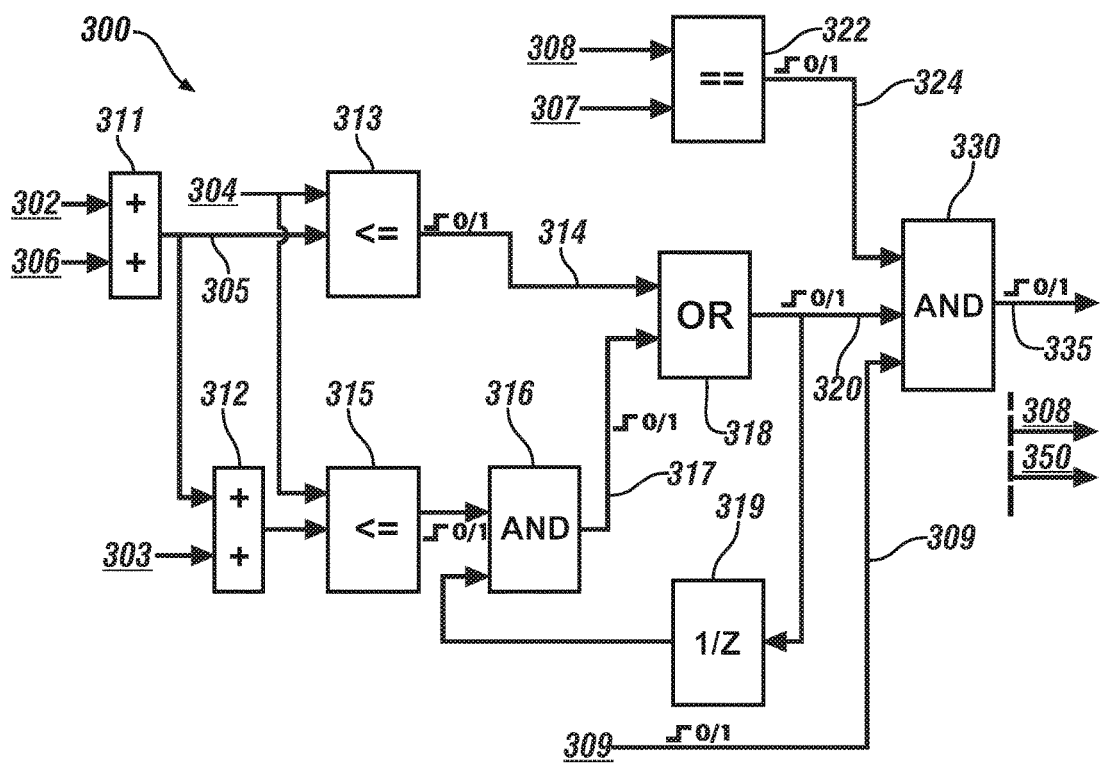
FIG. 3 schematically illustrates a torque converter clutch control routine to identify operating conditions at which to deactivate the torque converter clutch during vehicle deceleration, in accordance with the disclosure.
Figure 4:
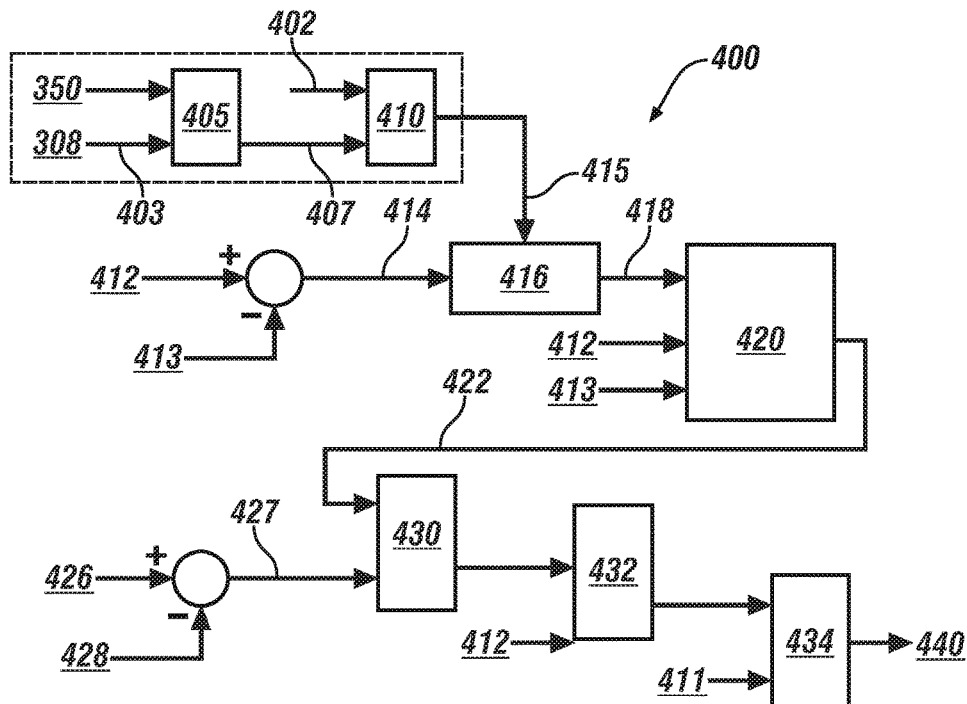
FIG. 4 schematically illustrates a regenerative braking ramp out routine, which includes dynamically determining a net effective regenerative braking torque capacity to ramp out regenerative braking effort during vehicle deceleration, in accordance with the disclosure.
Figure 5:
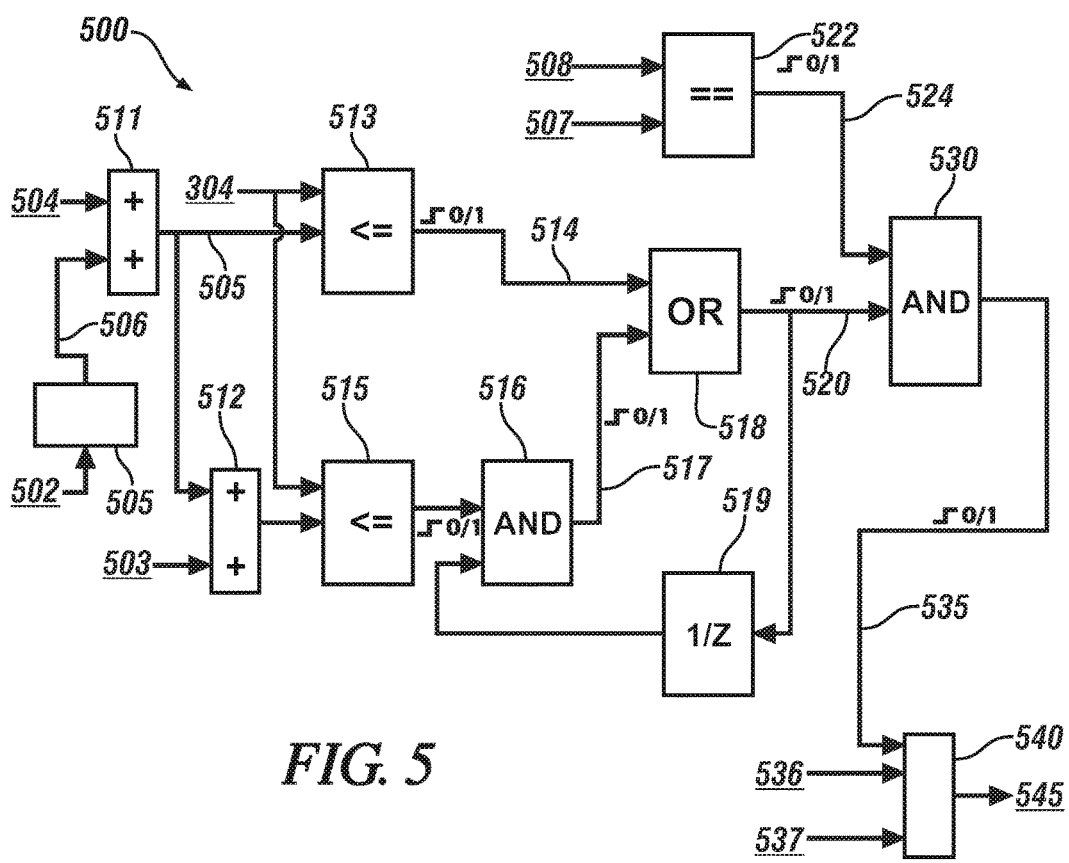
FIG. 5 schematically illustrates an engine state selection routine for controlling an engine state during vehicle deceleration, in accordance with the disclosure.

FIG. 2 and related FIGS. 3 through 5 schematically show details of a coordinated engine state selection and torque converter clutch release control routine (routine) 200 for controlling an embodiment of the powertrain system 20 employed in the vehicle 100 as described with reference to FIG. 1 in response to a change in an output torque request that includes vehicle deceleration. The change in the output torque request may include an operator input to either or both the accelerator pedal 15 and the brake pedal 16, including when the operator input to the accelerator pedal 15 is less than a minimum threshold that indicates coasting. The operator input to accelerator pedal 15 may be in conjunction with an operator input to the brake pedal 16 indicating a request for vehicle braking torque.

The routine 200 includes a torque converter clutch control routine 300, a regenerative braking ramp out routine 400, and an engine state selection routine 500, each which may be periodically executed during vehicle deceleration. Overall, the routine 200 includes, in response to a change in the output torque request that includes vehicle deceleration, initially operating with the internal combustion engine 40 in the ON state, in the fuel cutoff state and in the cylinder deactivation state, operating with the torque converter clutch 59 in an activated state, and operating the electric machine 35 in a regenerative braking state to transform vehicle momentum into electric power. When the engine speed is less than a first threshold speed, the internal combustion engine 40 transitions from the cylinder deactivation state to the all-cylinder state and the electric machine 35 continues to operate in the regenerative braking state, including ramping down the magnitude of regenerative braking torque. When the engine speed is less than a second threshold speed, the torque converter clutch 59 is deactivated or released, preferably coincident with the regenerative braking torque ramping down to zero.

The torque converter clutch control routine 300 is best described with reference to FIG. 3. The purpose of the torque converter clutch control routine 300 is to dynamically identify operating conditions at which to deactivate the torque converter clutch 59 during engine deceleration. Deactivating the torque converter clutch 59 may be combined with other operating conditions associated with controlling and ramping out the regenerative braking during vehicle and engine deceleration. Input parameters to the torque converter clutch control routine 300 include a minimum all-cylinder unfueled engine speed 302 and the present input speed 304. The minimum all-cylinder unfueled engine speed 302 is a calibrated value indicating a threshold speed for operating the engine 40 in the all-cylinder state while operating in the FCO state. When the engine 40 is operating in the FCO state, minimum all-cylinder unfueled engine speed 302 provides a line of separation between the all-cylinder state and the cylinder deactivation state, with the engine 40 being commanded to operate in the all-cylinder state when the present engine speed 304 is less than the minimum all-cylinder unfueled engine speed 302. A torque converter clutch timing margin 306 is added to the minimum all-cylinder unfueled engine speed 302 using summer 311 to determine a first target speed 305. The torque converter clutch timing margin 306 is a calibrated speed that is introduced to account for communication and control latencies between the various controllers including the TCM 53, ECM 44 and controller 12, and also account for an engine speed deceleration rate. The present engine speed 304 is compared with the first target speed 305 at a comparator 313, which generates an output 314 in the form of a logic 0 or 1, depending upon whether the present engine speed 304 is less than the first target speed 305 (1) or the present engine speed 304 is greater than the first target speed 305 (0). A hysteresis speed is introduced, which includes a hysteresis calibration speed 303, which is added to the first target speed 305 and compared with the present input speed 304 using a summer 312, comparator 315, an AND gate 316, and a logic inverter (1/Z) 319 to generate a hysteresis state 317, which is a logic 0 or 1. The hysteresis state 317 (0 or 1) and the output 314 are input to an OR gate 318, which generates an initial clutch release logic command 320 indicating either a command to implement the torque converter clutch release (1), or not (0).

A transmission state logic check includes a comparator 322 that compares a presently commanded transmission range 308 and a measured transmission gear multiplied by a calibration value 307, which generates a logic signal 324 of 1 when the presently commanded transmission range 308 equals the measured transmission gear multiplied by a calibration value 307, indicating the transmission 50 is operating as commanded. Otherwise, the comparator 322 generates a logic signal 324 of 0. A second logic check 309 indicates whether the torque converter clutch 59 is activated (1) or deactivated (0). The outputs from the initial clutch release logic command 320, the transmission state logic check comparator 322 and the second logic signal 309 are input to a logic AND gate 330. When the initial clutch release logic command 320 indicates the command to implement the torque converter clutch release (1), and the transmission state logic check comparator 322 indicates the transmission 50 is operating as intended (1) and the second logic check 309 indicates the torque converter clutch 59 is presently activated (1), the torque converter clutch control routine 300 generates a first signal 335(1) requesting the torque converter clutch 59 be deactivated. Otherwise a second signal 335(0) is generated, requesting the torque converter clutch 59 continue to be activated, at least as related to this routine. The selected one of the first and second signals 335(1), 335(0) is communicated to the TCM 53 for implementation. Other outputs from the torque converter clutch control routine 300 include the transmission range state 308 and a torque converter clutch release speed 350, which is the value for the input speed 304 when the torque converter clutch control routine 300 generates the first signal 335(1) requesting that the torque converter clutch 59 be deactivated.

The regenerative braking ramp out routine 400 is best described with reference to FIG. 4, and includes a process for dynamically determining a net effective regenerative braking torque capacity 440, which can be used to ramp out regenerative braking effort during vehicle deceleration. The torque converter clutch release speed 350 is divided by a gear speed 403 (405) to determine a first speed 407, which is subtracted from (410) the present transmission output speed 402 to determine a delta transmission output speed 415. The gear speed 403 is determined based upon the gear ratio of the present transmission range state 308, and the first speed 407 represents the torque converter clutch release speed 350 which has been converted to a transmission output speed by taking into account the gear ratio of the present transmission range state. The delta transmission output speed 415 provides a measure of the magnitude of transmission output speed that is greater than a minimum transmission output speed for torque converter clutch release.

A long term drivetrain torque capacity 412 is determined, and represents a regenerative torque capacity of the driveline and powertrain system taking into account mechanical capacity of the drivetrain to react torque. A net effective regenerative braking torque capacity from a previous iteration 413 of the regenerative braking ramp out routine 400 is subtracted therefrom to yield a delta torque capacity 414. The delta torque capacity 414 is combined with the delta transmission output speed 415 (416) to determine an initial regenerative braking torque ramp rate 418, which has units of Nm/cycle. The initial regenerative braking torque ramp rate 418 is subjected to gradient limiting (420) based upon the long term drivetrain torque capacity 412 and the net effective regenerative braking torque capacity from the previous iteration 413 to determine a preferred regenerative braking torque ramp rate 422. The preferred regenerative braking torque ramp rate 422 is thus dynamically controlled based upon the present operating conditions. The preferred regenerative braking torque ramp rate 422 is compared with a difference (427) between a creep torque 426 and a presently applied braking torque 428 (430: select maximum value), the long term drivetrain torque capacity 412 (432: select minimum value), and a short term drivetrain torque capacity 411 (434: select maximum value) to determine the net effective regenerative braking torque capacity 440 for this iteration. The net effective regenerative braking torque capacity 440 is communicated to the controller 12 as a motor control command that may be employed to command the inverter module 32 to control inverter states to operate the electric machine 35 in a regenerative braking state to transform vehicle momentum into electric power and provide regenerative braking.

The engine state selection routine 500 is best described with reference to FIG. 5, and includes a process for dynamically determining a power cost 545 associated with operating in the cylinder deactivation state, which may be communicated to the ECM 44 for use in an engine state control routine, which includes disabling the cylinder deactivation state.

The purpose of the engine state selection routine 500 is to dynamically identify operating conditions at which to disable engine operation in the cylinder deactivation state during engine deceleration, resulting in a command to operate the engine 40 in the all-cylinder state in conjunction with deactivating the torque converter clutch 59 and other operating conditions associated with controlling and ramping out regenerative braking during vehicle and engine deceleration. Input parameters to the engine state selection routine 500 include a minimum cylinder deactivation unfueled engine speed 504 and the present input speed 304. The minimum cylinder deactivation unfueled engine speed 504 is a calibrated value indicating a threshold speed for operating the engine 40 in the cylinder deactivation state while operating in the FCO state. When the engine 40 is operating in the FCO state, the minimum cylinder deactivation unfueled engine speed 504 provides a line of separation between the all-cylinder state and the cylinder deactivation state, with the engine 40 being commanded to operate in the all-cylinder state when the present input speed 304 is less than the minimum cylinder deactivation unfueled engine speed 502. A transmission output acceleration term 502 is provided to a disable margin calibration 505, which determines a speed margin 506 that is added to the minimum cylinder deactivation unfueled engine speed 502 using summer 511 to determine a first target speed 505. The speed margin 506 506 is a calibrated speed that is introduced to account for communication and control latencies between the various controllers including the TCM 53, ECM 44 and controller 12, and also account for an engine deceleration rate. The present engine speed 504 is compared with the first target speed 505 at a comparator 513, which generates an output 514 in the form of a logic 0 or 1, depending upon whether the present engine speed 504 is less than the first target speed 505 (1) or the present engine speed 504 is greater than the first target speed 505 (0). A hysteresis speed is introduced, which includes a hysteresis calibration speed 503 that is added to the first target speed 505. The resultant is compared with the present input speed 504 using a summer 512, comparator 515, an AND gate 516, and a logic inverter (1/Z) 519 to generate a hysteresis state 517, which is a logic 0 or 1. The hysteresis state 517 (0 or 1) and the output 514 are input to an OR gate 518, which generates an initial release logic command 520 indicating either a command to disable the cylinder deactivation state (1), or not (0).

A transmission state logic check includes a comparator 522 that compares a presently commanded transmission range 508 and a measured transmission gear multiplied by a calibration value 507, which generates a logic signal 324 of 1 when the presently commanded transmission range 508 equals the measured transmission gear multiplied by a calibration value 507, indicating the transmission 50 is operating as intended. Otherwise, the comparator 522 generates a logic signal 524 of 0. The outputs from the initial release logic command 520 and the transmission state logic check comparator 522 are input to a logic AND gate 530.

When the initial release logic command 520 indicates the command to disable the cylinder deactivation state (1), and the transmission state logic check comparator 522 indicates the transmission 50 is operating as intended (1), the engine state selection routine 500 generates a first, cylinder deactivation disablement signal 535(1) requesting the cylinder deactivation state be disabled. Otherwise a second signal 535(0) is generated, requesting the cylinder deactivation state continue to be activated, at least as relates to this routine. The selected one of the first and second signals 535(1), 535(0) is communicated to the ECM 44 for implementation. In one embodiment, the selected one of the first and second signals 535(1), 535(0) may be communicated to a second logic circuit in the form of an IF/THEN/ELSE logic element 540. The IF/THEN/ELSE logic element 540 has an output 545 that is equal to a predetermined power cost 537 associated with disabling the cylinder deactivation state to the ECM 44 when the first signal 535(1) is selected. The output 545 of the IF/THEN/ELSE logic element 540 is set to zero 536 when the second signal 535(0) is selected. The output 545 is sent to the ECM 44 for implementation.

FIG. 6 graphically shows engine speed during a deceleration event for an embodiment of the vehicle 100 and powertrain system 20 described with reference to FIG. 1 employing an embodiment of the coordinated engine state selection and torque converter clutch release control routine (routine) 200 described with reference to FIGS. 2 through 5. The vertical axes include engine speed (RPM) 601 and regenerative braking capacity (Nm) 603, which are plotted in relation to time (sec) 605. Engine speed 610 and a corresponding regenerative braking capacity 624 are shown. Threshold speeds or transition speeds include a minimum permissible speed for operating in the cylinder deactivation state 616 and a minimum permissible speed for operating the engine in the all-cylinder state 622. Commands include a torque converter clutch release command 618 and a torque converter clutch state 620. Timepoint 606 indicates a speed-related time at which the engine is commanded to transition to the all-cylinder state, indicated by a transition in the cylinder deactivation state signal 612. Timepoint 607 indicates a speed-related time at which the engine transitions to the all-cylinder state 614, prior to the engine speed 610 decreasing to the minimum permissible speed for operating in the cylinder deactivation state signal 616. Timepoint 608 indicates a speed-related time at which the torque converter clutch is commanded to deactivate. Timepoint 609 indicates a speed-related time at which the torque converter clutch deactivates, prior to the engine speed 610 decreasing to the minimum permissible speed for operating the all-cylinder state 622. The routine 200 enables increased time for energy recovery through regenerative braking. Furthermore there is no attendant increase in engine pumping losses during engine deceleration because the cylinder deactivation state is disabled only when engine speed decreases to the minimum permissible speed for operating in the cylinder deactivation state signal 616.

The coordinated engine state selection and torque converter clutch release control routine 200 described herein decreases a speed for releasing the torque converter clutch by permitting the engine to transition out of the cylinder deactivation state without refueling and operating the engine in the fueled state. This negates a need to release the torque converter clutch at an elevated speed to maintain drivability during rapid deceleration events. Unfueled deceleration events may be extended, thus providing for additional regenerative braking by coordinating torque converter clutch release, regenerative braking ramp-out, and cylinder deactivation disablement. This may be accomplished by targeting the unfueled all-cylinder minimum speed for release the torque converter clutch, and using a variable ramp-out scheme for regenerative braking that allows for a calibratable clutch release speed to extend regenerative braking, depending upon the operating conditions. The regenerative braking ramps out at or near the torque converter clutch release point.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling a powertrain including an internal combustion engine and an electric machine rotatably coupled via a torque converter to a transmission, wherein an output member of the transmission is rotatably coupled to a driveline, the method comprising:
in response to an output torque request that includes deceleration:
operating the internal combustion engine in a fuel cutoff state and in a cylinder deactivation state, controlling a clutch of the torque converter in an activated state, and operating the electric machine in a regenerative braking state;
monitoring a state of the powertrain related to engine speed; commanding the internal combustion engine to transition from the cylinder deactivation state to an all-cylinder state and operating the electric machine in the regenerative braking state including ramping down magnitude of regenerative braking torque when the engine speed is less than a first threshold speed; and
commanding the torque converter clutch to a released state when the engine speed is less than a second threshold speed;
wherein the first threshold speed is greater than the second threshold speed.

2. The method of claim 1, wherein the first threshold speed and the second threshold speed are determined based upon a rate of change in the engine speed.

3. The method of claim 1, wherein the first threshold speed is determined based upon a minimum permissible speed for operating the engine in the cylinder deactivation state.

4. The method of claim 1, wherein the second threshold speed is determined based upon a minimum permissible speed for operating the engine in the all-cylinder state in conjunction with the fuel cutoff state.

5. The method of claim 1, further comprising ramping down the magnitude of regenerative braking torque such that the regenerative braking torque achieves zero torque coincident with the commanding the torque converter clutch to the released state.

6. The method of claim 1, wherein monitoring a state of the powertrain related to engine speed comprises monitoring an input speed to the transmission.

7. The method of claim 1, wherein commanding the internal combustion engine to transition from the cylinder deactivation state to the all-cylinder state comprises commanding the internal combustion engine to transition from the cylinder deactivation state to the all-cylinder state while operating the engine in the fuel cutoff state.

8. A method for controlling an internal combustion engine, an electric machine and a clutch of a torque converter, wherein the engine and electric machine rotatably couple via the torque converter to a transmission having an output member rotatably coupled to a vehicle driveline, the method comprising:
commanding operation of the internal combustion engine in a fuel cutoff state and in a cylinder deactivation state, controlling a clutch of the torque converter in an activated state, and operating the electric machine in a regenerative braking state in response to an output torque request that includes deceleration;
commanding the internal combustion engine to transition from the cylinder deactivation state to an all-cylinder state when engine speed is less than a first threshold speed, and ramping down regenerative braking torque when engine speed is less than a first threshold speed; and
commanding release of the torque converter clutch when the engine speed is less than a second threshold speed that is less than the first threshold speed.

9. The method of claim 8, wherein the first threshold speed and the second threshold speed are determined based upon a rate of change in the engine speed.

10. The method of claim 8, wherein the first threshold speed is determined based upon a minimum permissible speed for operating the engine in the cylinder deactivation state.

11. The method of claim 8, wherein the second threshold speed is determined based upon a minimum permissible speed for operating the engine in the all-cylinder state in conjunction with the fuel cutoff state.

12. The method of claim 8, further comprising ramping down the magnitude of regenerative braking torque such that the regenerative braking torque achieves zero torque coincident with a release of the torque converter clutch.

13. The method of claim 8, wherein commanding the internal combustion engine to transition from the cylinder deactivation state to the all-cylinder state comprises commanding the internal combustion engine to transition from the cylinder deactivation state to the all-cylinder state while operating the engine in the fuel cutoff state.

14. A powertrain system, comprising:
an internal combustion engine;
an electric machine rotatably coupled to the internal combustion engine;
a torque converter including a controllable clutch;
a transmission having an output member rotatably coupled to a driveline; and
a controller, operatively connected to the internal combustion engine, the torque converter, and the electric machine, the controller including an instruction set, the instruction set executable to:
monitor an output torque request,
determine engine speed,
command the internal combustion engine to operate in a fuel cutoff state and in a cylinder deactivation state, control the torque converter clutch in an activated state, and operate the electric machine in a regenerative braking state when the output torque request includes deceleration,
command the internal combustion engine to transition from the cylinder deactivation state to an all-cylinder state when the engine speed is less than a first threshold speed,
ramp down regenerative braking torque when the engine speed is less than a first threshold speed, and command the torque converter clutch to a released state when the engine speed is less than a second threshold speed that is less than the first threshold speed.

15. The powertrain system of claim 14, wherein the command to the internal combustion engine to transition from the cylinder deactivation state to the all-cylinder state comprises a command to the internal combustion engine to transition from the cylinder deactivation state to the all-cylinder state while operating the engine in the fuel cutoff state.

16. The powertrain system of claim 14, wherein the first threshold speed and the second threshold speed are determined based upon a rate of change in the engine speed.

17. The powertrain system of claim 14, wherein the first threshold speed is determined based upon a minimum permissible speed for operating the engine in the cylinder deactivation state.

18. The powertrain system of claim 14, wherein the second threshold speed is determined based upon a minimum permissible speed for operating the engine in the all-cylinder state in conjunction with the fuel cutoff state.

19. The powertrain system of claim 14, further comprising the instruction set executable to ramp down the magnitude of regenerative braking torque such that the regenerative braking torque achieves zero torque coincident with the command to the torque converter clutch to the released state.

* * * * *